United States Patent
Shiozaki et al.

(10) Patent No.: US 6,915,888 B2
(45) Date of Patent: Jul. 12, 2005

(54) EXTERNAL CONTROL TYPE FAN-COUPLING DEVICE

(75) Inventors: Ken Shiozaki, Susono (JP); Yoshinobu Iida, Numazu (JP)

(73) Assignee: Usui Kokusai Sangyo Kaisha Limited (JP)

(*) Notice: Subject to any disclaimer, the term of this patent is extended or adjusted under 35 U.S.C. 154(b) by 0 days.

(21) Appl. No.: 10/691,195

(22) Filed: Oct. 21, 2003

(65) Prior Publication Data

US 2004/0124057 A1 Jul. 1, 2004

(30) Foreign Application Priority Data

Oct. 22, 2002 (JP) ........................................ 2002-307515
Oct. 2, 2003 (JP) ........................................ 2003-344879

(51) Int. Cl.[7] .............................................. F16D 35/02
(52) U.S. Cl. ..................................... 192/58.61; 192/58.8
(58) Field of Search .............................. 192/58.61, 58.8

(56) References Cited

U.S. PATENT DOCUMENTS

| | | |
|---|---|---|
| 2,879,755 A | 3/1959 | Weir |
| 2,988,188 A | 6/1961 | Tauschek |
| 3,059,745 A | 10/1962 | Tauschek |
| 3,217,849 A | 11/1965 | Weir |
| 3,259,221 A | 7/1966 | Godfrey |
| 3,272,188 A | 9/1966 | Sabat |
| 3,430,743 A | 3/1969 | Fujita et al. |
| 3,463,282 A | 8/1969 | Fujita et al. |
| 3,642,105 A | 2/1972 | Kikuchi |
| 3,727,735 A | 4/1973 | La Flame |
| 3,840,101 A | 10/1974 | Peter et al. |
| 3,856,122 A | 12/1974 | Leichliter |
| 3,893,555 A | 7/1975 | Elmer |
| 3,964,582 A | 6/1976 | Mitchell |
| 4,238,016 A | 12/1980 | Yoshida et al. |
| 4,281,750 A | 8/1981 | Clancey |
| 4,403,684 A | 9/1983 | Haeck |
| 4,505,367 A | 3/1985 | Martin |
| 4,556,138 A | * 12/1985 | Martin et al. ............ 192/58.61 |
| 4,629,046 A | 12/1986 | Martin |

(Continued)

FOREIGN PATENT DOCUMENTS

| | | | |
|---|---|---|---|
| EP | 0407750 A1 | * 1/1991 | .......... F16D/67/06 |
| JP | 54-25581 | 8/1979 | |
| JP | 55-76226 | 6/1980 | |
| JP | 57-1829 | 1/1982 | |
| JP | 57-167533 | 10/1982 | |

(Continued)

Primary Examiner—Richard M. Lorence
(74) Attorney, Agent, or Firm—Gerald E. Hespos; Anthony J. Casella

(57) ABSTRACT

To reduce the size/weight and the power consumption of a fan-coupling device and to provide an external control type fan-coupling device intended to improve a fan rotation controllability.

A fan-coupling device, in which the inside of a sealed housing borne on a rotary shaft fixing a drive disk thereon is divided by a partition into an oil sump and a torque transmission chamber housing the drive disc, so that the drive torque may be transmitted to a driven side with the oil fed into the torque transmission chamber and so that the communication passage of oil may be opened/closed and controlled by a valve member to be activated by an electromagnet. In the fan-coupling device, a magnetic member of either an integral structure or a split structure composed of a plurality of parts and assembled integrally is arranged between the electromagnet and the valve member (or armature), and the magnetic member is so assembled in the sealed housing that the magnetic flux of the electromagnet may be transmitted through the magnetic member to the armature.

16 Claims, 6 Drawing Sheets

U.S. PATENT DOCUMENTS

| | | |
|---|---|---|
| 4,665,694 A | 5/1987 | Brunken |
| 4,667,791 A | 5/1987 | Martin et al. |
| 4,685,549 A | 8/1987 | Brunken et al. |
| 4,699,258 A | 10/1987 | Johnston et al. |
| 4,796,571 A | 1/1989 | Ono et al. |
| 4,846,331 A | 7/1989 | Ono |
| 4,850,465 A | 7/1989 | Ono |
| 4,903,643 A | 2/1990 | Takikawa et al. |
| 4,903,805 A | 2/1990 | Ono |
| 4,930,458 A | 6/1990 | Takikawa et al. |
| 5,004,085 A | 4/1991 | Taureg |
| 5,018,612 A | 5/1991 | Takikawa et al. |
| 5,060,774 A | 10/1991 | Takikawa et al. |
| 5,090,533 A | 2/1992 | Inoue |
| 5,101,949 A | 4/1992 | Takikawa et al. |
| 5,109,965 A | 5/1992 | Inoue |
| 5,119,920 A | 6/1992 | Inoue |
| 5,125,491 A | 6/1992 | Takikawa et al. |
| 5,139,125 A | 8/1992 | Takikawa et al. |
| 5,232,074 A | 8/1993 | Watanabe |
| 5,452,782 A | 9/1995 | Inoue |
| 5,501,183 A | 3/1996 | Takayama |
| 5,511,643 A * | 4/1996 | Brown ..................... 192/58.61 |
| 5,575,368 A | 11/1996 | Kikuchi et al. |
| 5,642,560 A * | 7/1997 | Tabuchi et al. ............... 29/607 |
| 5,794,749 A | 8/1998 | Ryuu |
| 5,870,818 A * | 2/1999 | Bisaga ....................... 29/607 |
| 5,881,857 A | 3/1999 | Ryuu |
| 5,992,594 A * | 11/1999 | Herrle et al. ............ 192/58.61 |
| 6,125,981 A | 10/2000 | Ito et al. |
| 6,247,567 B1 | 6/2001 | Watanabe |
| 6,443,283 B1 * | 9/2002 | Augenstein et al. ..... 192/58.61 |
| 6,550,596 B2 | 4/2003 | Shiozaki et al. |
| 2002/0003075 A1 * | 1/2002 | Shiozaki et al. ......... 192/58.61 |

FOREIGN PATENT DOCUMENTS

| | | |
|---|---|---|
| JP | 57-179431 | 11/1982 |
| JP | 59-27452 | 7/1984 |
| JP | 62-124330 | 6/1987 |
| JP | 62-194038 | 8/1987 |
| JP | 63-182332 | 11/1988 |

* cited by examiner

EXTERNAL CONTROL TYPE FAN-COUPLING DEVICE

BACKGROUND OF THE INVENTION

1. Field of the Invention

The present invention relates generally to an external control type fan-coupling device, in which an engine cooling fan rotation in an automobile or the like is controlled according to the temperature change in the surrounding, the change in the running condition of the engine or the like.

2. Description of the Related Art

In the prior art, there is a fan-coupling device of this kind, wherein the inside of a sealed housing composed of a case and a cover is divided by a partition having an oil feed adjusting hole into an oil sump and a torque transmission chamber housing a drive disc therein, wherein a dam formed is in such a portion, in which the oil accumulates at a rotating time, of the inner circumference wall face of the sealed housing side confronting the outer circumference wall portion of the drive disc, wherein an oil circulation passage is formed to lead to the dam between the torque transmission chamber and the oil sump, and wherein a valve member is provided for opening the feed adjusting hole of the partition when the temperature or the like of the surrounding is higher than a set value and for closing the feed adjusting hole of the partition when not higher than the set value, whereby the effective contact area of oil at a torque transmission clearance portion formed in the wall face, as confronting the drive disc, in the outer vicinity of the sealed housing is increased/decreased to control the torque transmission from the drive side to the sealed housing on the driven side. A pair of electromagnets are provided on the front side or the back side of the sealed housing, and a valve member having a magnetism for opening/closing the feed adjusting hole is proposed to confront one of the electromagnets (as referred to Japanese Patent No. 2911623 and JP-A-3-61727).

In the case of the external control type fan-coupling device of the prior art, however, the electromagnets for activating the valve member and the armature are separated by the case of the non-magnetic member so that the magnetic force cannot be efficiently transmitted to the armature. An excessive electromagnetic force is needed for attracting the armature. There arise problems that the size and weight of the electromagnets are enlarged, that the fan-coupling device cannot be reduced in size and weight, and that more power consumption is needed. If the armature is located at a position spaced from the rotary shaft in the oil sump, moreover, there arises a defect that the action of the armature, i.e., the activity of opening/closing the valve member is deteriorated by the resistance of the oil because the armature always exists in the oil while the fan is rotating.

SUMMARY OF THE INVENTION

The present invention has been conceived to solve the problems of the external control type fan-coupling device of the prior art, and contemplates to reduce the size/weight and the power consumption of a fan-coupling device and to provide an external control type fan-coupling device intended to improve a fan rotation controllability.

The external control type fan-coupling device according to the invention is constructed such that a ring-shaped magnetic member for transmitting the magnetic flux of an electromagnet efficiently to the armature of each valve member is assembled in the case. The gist of the invention resides in a fan-coupling device wherein the inside of a sealing housing composed of a case of a non-magnetic material and a cover mounted on the case and borne through a bearing on a rotary shaft member having a drive disc fixed on its leading end is divided by a partition into an oil sump and a torque transmission chamber housing the drive disc, wherein a valve member preferably having a magnetism for opening/closing a dam formed in such a portion, in which the oil accumulates at a rotating time, of the inner circumference wall face of a cover confronting the outer circumference wall portion of the drive disc and an oil circulation passage formed to lead to the dam between the torque transmission chamber and the oil sump is provided in the oil sump, and wherein an electromagnet is supported preferably on the rotary shaft member through a bearing on the side of the oil sump of the sealed housing, whereby the valve member is activated by the electromagnet to open/close and control the oil circulation passage so that the effective contact area of oil at a torque transmission clearance portion between a drive side and a driven side may be increased/decreased to control the torque transmission from the drive side to the driven side. In this fan-coupling device, a magnetic member of either an integral structure or a split structure composed of a plurality of parts and assembled integrally is arranged between the electromagnet and the valve member and is so assembled in the sealed housing that the magnetic flux of the electromagnet may be effectively transmitted to the valve member through the magnetic member.

In this external control type fan-coupling device, the magnetic member (or the magnetic loop element) of the integral structure can be constructed to have a plurality of arcuate holes in one preferably disc-shaped plate member and can be sealed by filling the arcuate holes with a sealant. Moreover, the magnetic member (or the magnetic loop element) of the split structure can be formed into a ring shape. This ring-shaped magnetic member of the split structure: (1) is constructed to include an inner ring and an outer ring and to have a ring-shaped space between the inner ring and the outer ring, and the inner ring and the outer ring are jointed by a non-magnetic material ring fitted and fixed between the inner ring and the outer ring; (2) the same is constructed to include an inner ring and an outer ring and to have a ring-shaped space between the inner ring and the outer ring, in that the inner ring and the outer ring are fitted and fixed with a non-magnetic material ring, and the non-magnetic material ring and the inner ring and the outer ring are jointed by brazing them or the like; (3) the same is constructed to include an inner ring and an outer ring and to have a ring-shaped space between the inner ring and the outer ring, in that a non-magnetic ring is fitted and fixed between the inner ring and the outer ring, and the ring-shaped space is sealed by filling it with a rubbery sealant; (4) the same is constructed to include an inner ring and an outer ring and to have a ring-shaped space between the inner ring and the outer ring, the inner ring and the outer ring are jointed, while holding the ring-shaped space, with a non-magnetic material disposed at a plurality of portions in the ring-shaped space, and the ring-shaped space at the portions other than the portions jointed with the non-magnetic material is sealed by filling the portions with a sealant; (5) the rubbery sealant filling the ring-shaped space is baked on the inner ring and the outer ring and, preferably, on the non-magnetic material ring; and (6) the sealing filling the ring-shaped space protrudes from the inner ring and/or the outer ring toward the valve member. Here, fluororubber is suited as the rubbery sealer.

In the invention, moreover, the valve member is made of a leaf spring material of steel and has an armature. Still moreover, the armature is arranged in the vicinity of the rotary shaft member.

Here, in case the size of the armature for activating the valve member may be smaller than that of the electromagnet, it goes without saying that the magnetic member (or the magnetic loop element) of the split structure may be arranged not in the ring shape but at a point.

The external control type fan-coupling device according to the invention is enabled to reduce the size and weight of the electromagnet and to reduce the power consumption by mounting such a magnetic member in the non-magnetic case as transmits the magnetic flux of the electromagnet efficiently to the valve member (having the armature). Moreover, this magnetic member (or the magnetic loop element) is constructed either of the integral structure of the inner ring and the outer ring or the split structure, which is composed of a plurality of parts but is assembled into an integral structure and in which the inner ring and the outer ring are jointed preferably by brazing them with anonmagnetic material. Thus, the leakage of the magnetic flux of the electromagnetic coil can be suppressed to enhance the attraction efficiency of the armature drastically and to retain the sealing property against the dust or oil. In case the ring-shaped space is baked and molded with a rubber sealant and in case the rubber is protruded from the two rings toward the armature, moreover, the rubber acts as the shock absorbing member of the contact face between the magnetic loop element and the armature thereby to provide an effect that it is possible to prevent the noise and wear from being caused by the contact between the two parts.

By the construction in which the valve member (or the armature) is arranged in the vicinity of the rotary shaft member (or the drive shaft), moreover, the activity of the valve member in the oil sump is improved to provide an excellent effect that the fan rotation controllability can be improved.

DESCRIPTION OF THE PREFERRED EMBODIMENTS

Figure 1:
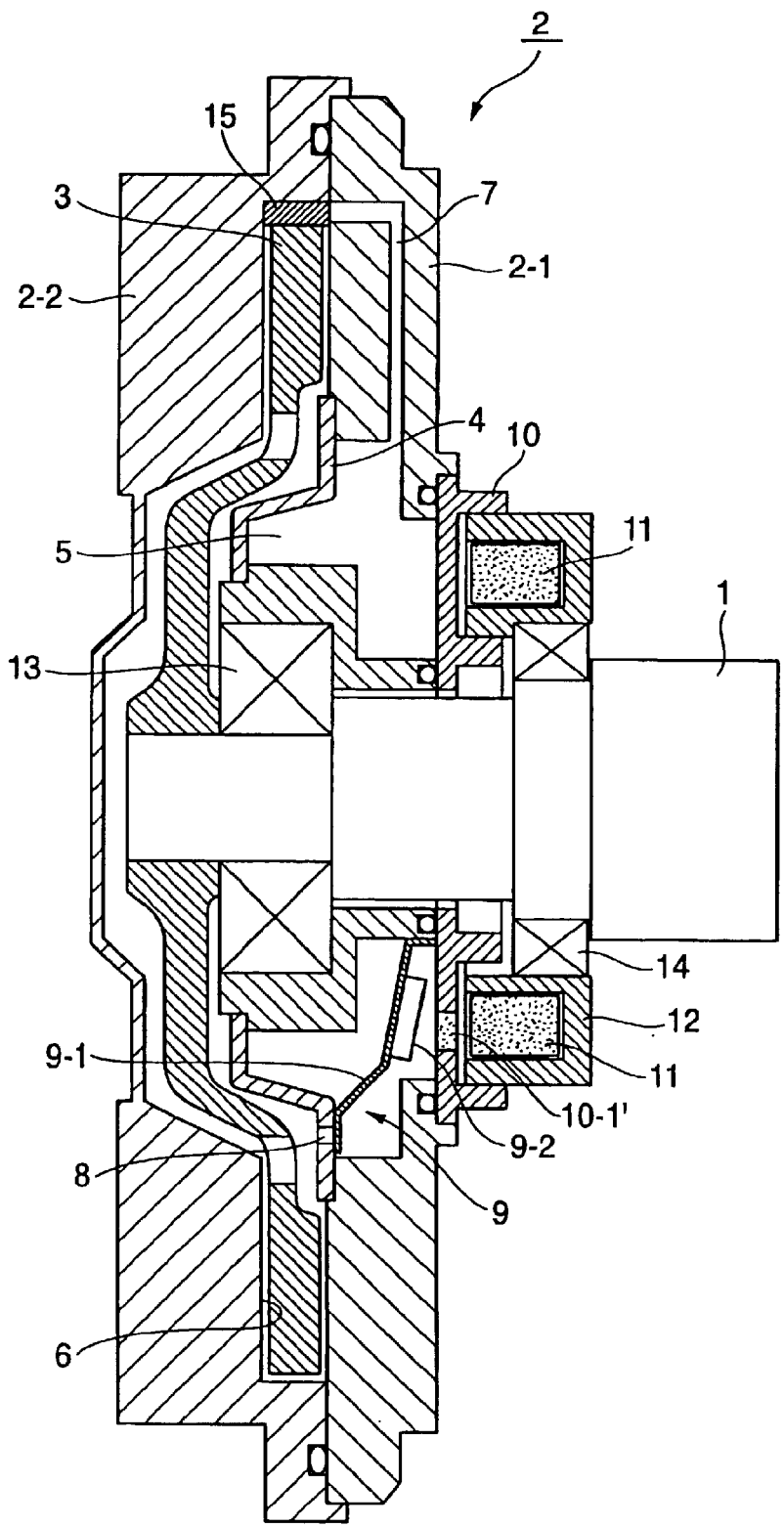
FIG. 1 is a longitudinally sectional side elevation showing one embodiment of an external control type fan-coupling device according to the invention.

In FIG. 1 to FIG. 9: numeral 1 designates a rotary shaft member (or a drive shaft); numeral 2 a sealed housing; numeral 2-1 a case; numeral 2—2 a cover; numeral 3 drive disc; numeral 4 a partition; numeral 5 an oil sump; numeral 6 a torque transmission chamber; numeral 7 an oil recovering circulation passage; numeral 8 an oil feed adjusting hole; numeral 9 an oil feeding valve member; numeral 9-1 a leaf spring; numeral 9-2 an armature; numeral 10 a disc-shaped magnetic loop element (or a magnetic member) having a ring portion; numerals 20 and 30 ring-shaped magnetic loop elements (or a magnetic member); numeral 40 a non-ring-shaped magnetic loop element (or a magnetic member); numeral 11 an electromagnet; numeral 12 an electromagnet support; numerals 13 and 14 bearings; and numeral 15 a dam.

In the external control type fan-coupling device shown in FIG. 1, more specifically, the sealed housing 2 having the case 2-1 and the cover 2—2 is borne through the bearing 13 on the rotary shaft member (or a drive shaft) 1, which is rotated by the drive of a not-shown drive unit (or an engine). The sealed housing 2 has its inside divided into the oil sump 5 and the torque transmission chamber 6 by the partition 4 having the oil feed adjusting hole 8. The drive disc 3, as fixed on the leading end of the rotary shaft member 1, is so housed in the torque transmission chamber 6 as to form a torque transmission clearance between itself and the inner circumference of the torque transmission chamber.

Here, the dam 15 is formed in a portion, in which the oil accumulates at the rotating time, of the inner circumference wall face of the cover 2—2 confronting the outer circumference wall portion of the drive disc 3.

The case 2-1 is provided with the oil recovering circulation passage 7. The oil feeding valve member 9 for opening/closing the oil feed adjusting hole 8 formed in the partition 4 is composed of the leaf spring 9-1 and the armature 9-2. In order to hardly receive the resistance of the oil in the oil sump 5 at the fan rotating time, the leaf spring 9-1 so is mounted at its root end portion on the case 2-1 that the armature 9-2 of the valve member may be positioned in the vicinity of the rotary shaft member (or the drive shaft) 1.

On the drive unit side of the sealed housing 2, the ring-shaped electromagnet 11 is supported on the ring-shaped electromagnet support 12 which is not only borne on the rotary shaft member 1 through the bearing 14 and but also fixed on an external member (although not shown) such as an engine block. The disc-shaped magnetic loop element (or the magnetic member) 10 having the ring portion assembled in the case 2-1 is mounted to confront the armature 9-2 of the valve member. The support 12 is fitted at its portion in the magnetic loop element 10. This magnetic loop element 10 has an integral structure having three arcuate holes 10-1 formed in one donut-shaped disc, as shown in a front elevation in FIG. 2. Numeral 10-2 designates three reinforcing bridges joining the inner sides and the outer sides of the arcuate holes 10-1. Here, the arcuate holes 10-1 are sealed with a sealant 10-1'. In short, in order to transmit the magnetic flux of the electromagnet 11 may be efficiently transmitted in the invention to the armature 9-2 of the valve member, an activation mechanism for the oil feeding valve member 9 is constructed by using the disc-shaped magnetic loop element 10 having the ring portion.

In the fan-coupling device thus constructed, when the electromagnet 11 is OFF (or demagnetized), the armature 9-2 is made to leave the magnetic loop element 10 by the action of the leaf spring 9-1 so that the oil feed adjusting hole 8 is closed (in FIG. 3A) to stop the oil feed to the inside of the torque transmission chamber 6. When the electromagnet 11 is ON (or magnetized), the armature 9-2 is attracted against the leaf spring 9-1 toward the magnetic loop element 10 so that the leaf spring 9-1 is moved into abutment the side of the case 2-1 to open the oil feed adjusting hole 8 (in FIG. 3B) thereby to feed the oil to the inside of the torque transmission chamber 6.

In the invention, moreover, magnetic loop elements 20, 30 and 40 of split structures, which are composed of a plurality of parts and assembled integrally, as shown in FIG. 4, FIG. 5, FIG. 6, FIG. 7, FIG. 8 and FIG. 9, are used to make the magnetic loop element 10 in the fan-coupling device of the aforementioned construction more efficient.

Figure 2:
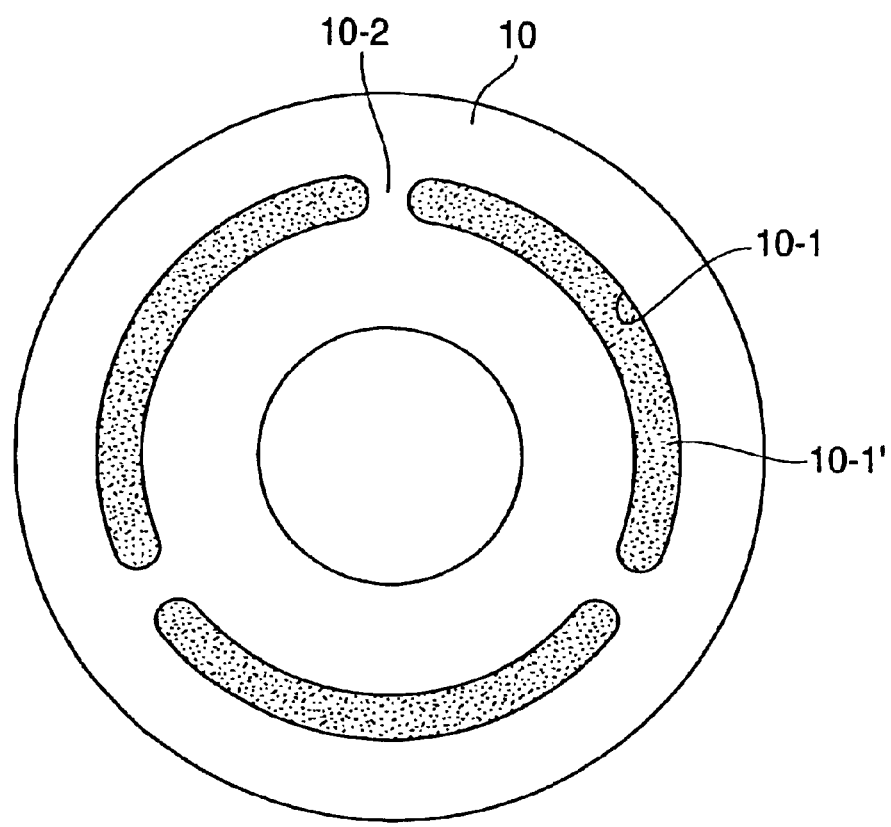
FIG. 2 is a front elevation showing a magnetic loop element (or a magnetic member) of an integral structure of the same device.
Figure 3A:
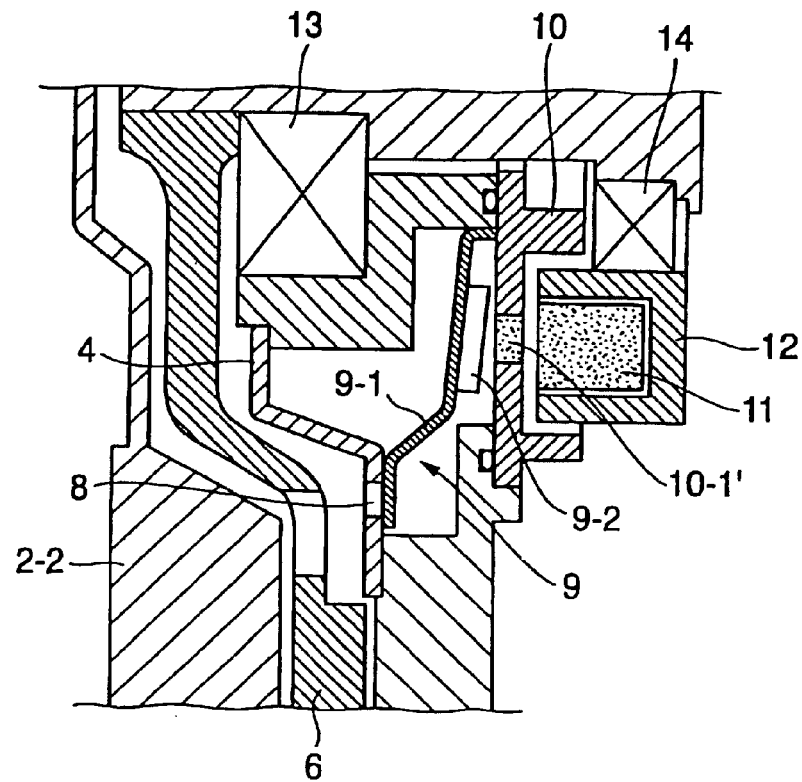
FIG. 3 presents a longitudinally sectional side elevation showing an essential portion of the same device in an enlarged scale, (A) shows a state without magnetization, and (B) shows a state with magnetization.
Figure 3B:
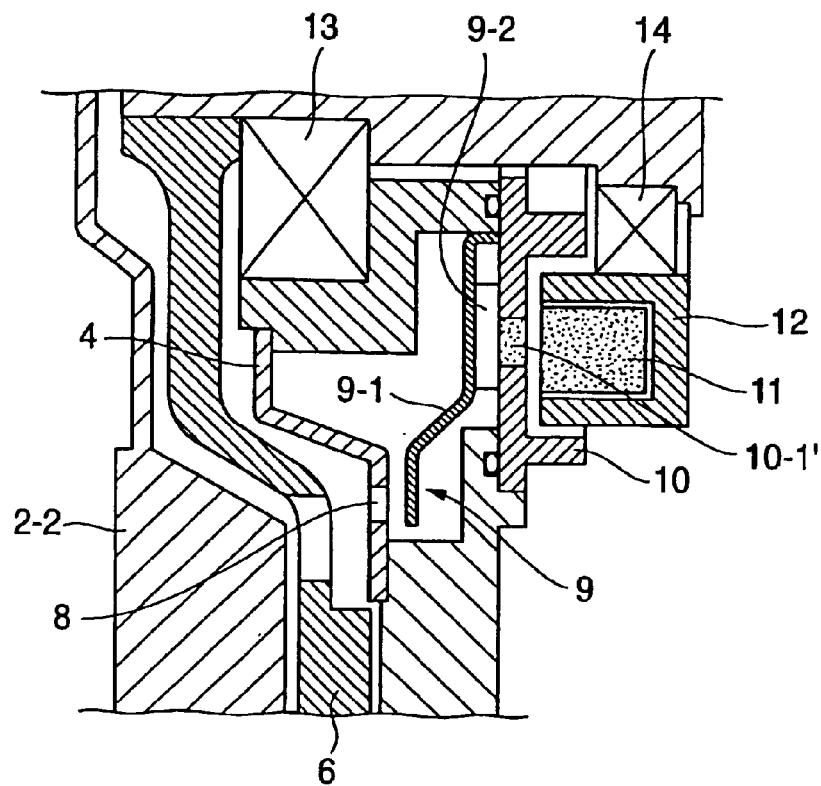

In the case of the magnetic loop element 10 of the integral structure, more specifically, the structure is made such that the three arcuate slots 10-1 are formed in the single donut-shaped disc, as shown in FIG. 2. Therefore, the magnetic flux of the electromagnet 11 partially leaks from the portions of the reinforcing bridges 10-2 joining the inner sides and the outer sides of the arcuate holes 10-1 so that the attraction efficiency of the armature 9-2 cannot be sufficiently enhanced. Moreover, the magnetic loop element not only transmits the magnetic force to the armature 9-2 but also acts as the seal for the oil or dust in the sealed housing 2. Therefore, it is important to make these sealing property and magnetic efficiency compatible.

Figure 4:
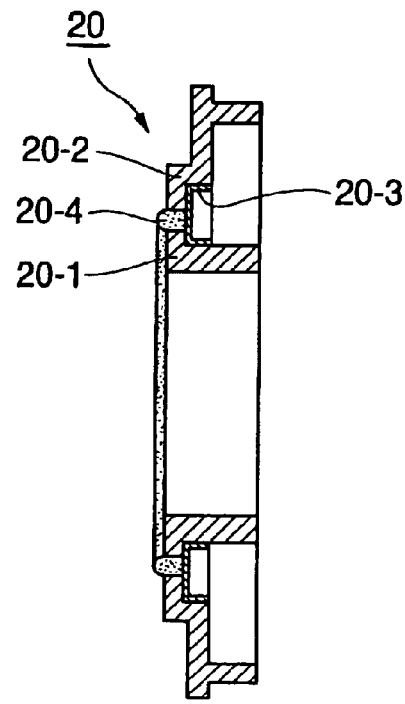
FIG. 4 is a longitudinally sectional side elevation of another embodiment (of a ring shape of a split structure, which is composed of a plurality of parts and assembled integrally) of the magnetic loop element (or a magnetic member) of the same device.
Figure 5:
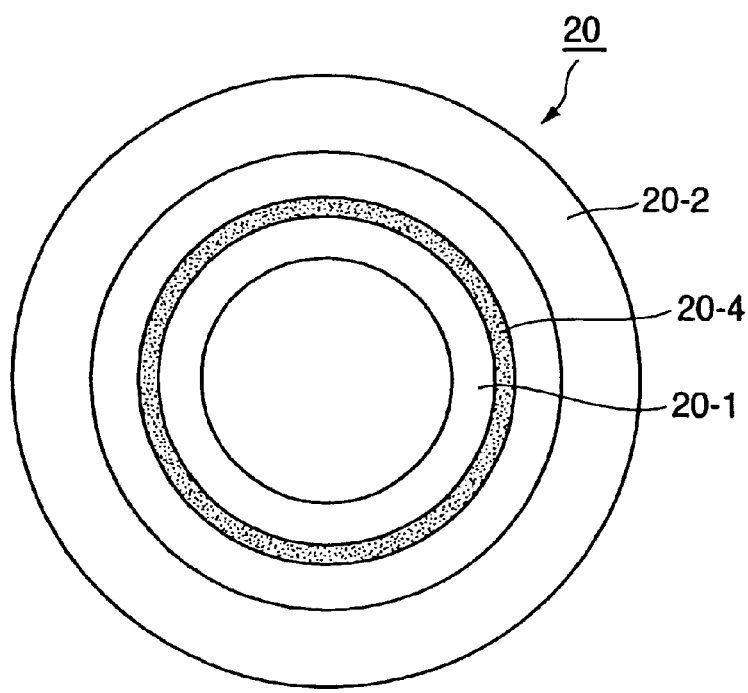
FIG. 5 is a front elevation of the magnetic loop element of the same ring shape.

The magnetic loop elements 20, 30 and 40 of the split type, as shown in FIG. 4 to FIG. 9, are improved to cope with those technical problems. The structure of the ring-shaped magnetic loop element, as shown in FIG. 4 and FIG. 5, is made to have its body composed of two parts (or pieces) of an inner ring 20-1 and an outer ring 20-2, and a ring-shaped space is formed between the inner ring 20-1 and the outer ring 20-2. A ring of a non-magnetic material (made of stainless steel or copper alloy) 20-3 is fitted and fixed in that ring-shaped space (between the inner ring 20-1 and the outer ring 20-2). The fixing means of the non-magnetic material ring 20-3 can be exemplified by brazing, welding, press-fitting or adhering means and can also seal between the individual rings. And, the ring-shaped space among the inner ring 20-1, the outer ring 20-2 and the non-magnetic material ring 20-3 can also be jointed either by a rubber baking molding 20-4 of fluororubber or the like or by press-fitting or adhering a seal member thereby to seal off the oil or dust. Here in case the ring-shaped space is sealed with the fluororubber or the like, this rubber is protruded from the inner ring 20-1 or the outer ring 20-2 toward the armature. This protrusion is made so that the protrusion may abut earlier against the armature 9-2 to decelerate the collision velocity thereby to attain the shock absorbing effect at the contacting time between the magnetic loop element 20 and the armature 9-2.

In the aforementioned case of the ring-shaped magnetic loop element 20 of the two-split structure, as shown in FIG. 4 and FIG. 5, the inner ring 20-1 and the outer ring 20-2 are jointed with the non-magnetic material 20-3 such as stainless steel or copper alloy so that the construction can suppress the leakage of the magnetic flux. Therefore, the armature 9-2 can be attracted efficiently without any leakage of the magnetic flux. Moreover, the joint and the sealing property can be simultaneously retained either by baking and molding the inner ring 20-1, the outer ring 20-2 and the non-magnetic material 20-3 with fluororubber or the like or by brazing them or the like. By protruding the rubber from the inner ring 20-1 or the outer ring 20-2 toward the armature side, moreover, the protrusion abuts earlier against the armature 9-2 to decelerate the collision velocity so that it may also act as a shock absorber for the contact face between the magnetic loop element 20 and the armature 9-2, thereby to attain the effect capable of preventing the noise and wear from being caused by the contact between the two parts.

Figure 6:
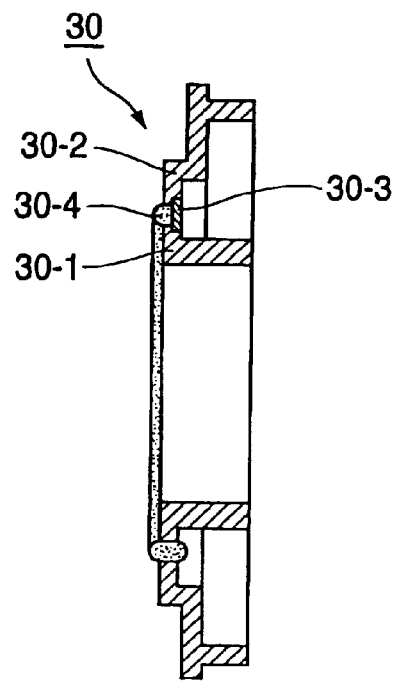
FIG. 6 is a longitudinally sectional side elevation showing another embodiment of the ring-shaped magnetic loop element (or a magnetic member) of the same device.
Figure 7:
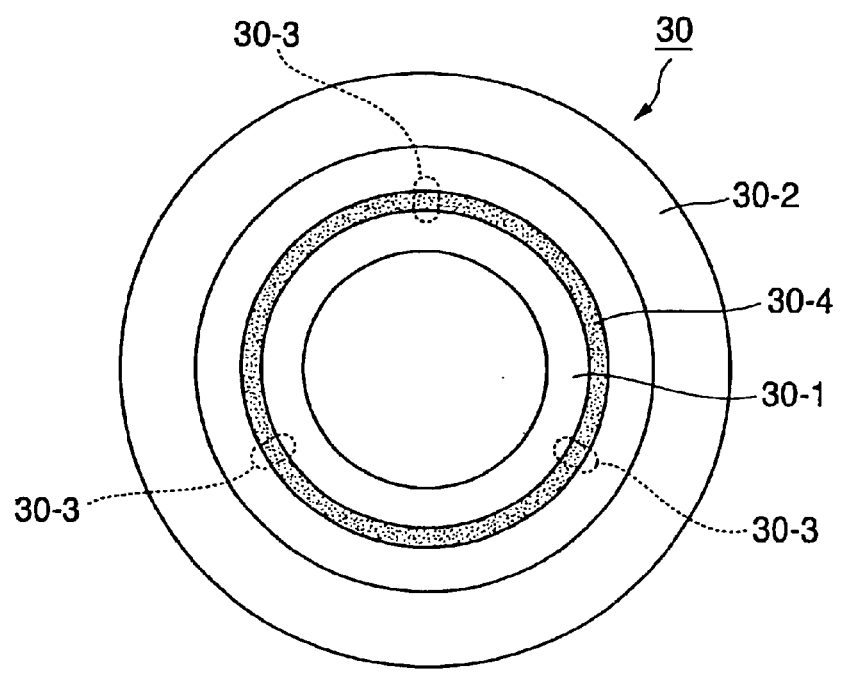
FIG. 7 is a front elevation of the same ring-shaped magnetic loop element.

The structure of the ring-shaped magnetic loop element 30, as shown in FIG. 6 and FIG. 7, is made to have its body composed of two parts (or pieces) of an inner ring 30-1 and an outer ring 30-2, and a ring-shaped space is formed between the inner ring 30-1 and the outer ring 30-2. Plate-shaped or rod-shaped non-magnetic materials 30-3 are arranged at a plurality of portions (e.g., three portions) of that ring-shaped space (between the inner ring 30-1 and the outer ring 30-2) to joint the inner ring 30-1 and the outer ring 30-2. And, the ring-shaped space by the three non-magnetic materials 30-3 other than the jointed portions is filled by baking and molding it with fluororubber 30-4 or the like or by filling it with a sealer for attaining shock-absorbing actions like those of the fluororubber, thereby to seal off the oil or dust. In case the ring-shaped space is sealed either by baking the fluororubber or the like or with the sealer for the shock-absorbing actions like those of the fluororubber, the sealer of the fluororubber or the like is protruded in this embodiment, too, from the inner ring 30-1 or the outer ring 30-2 toward the armature side so as to attained the shock absorbing effect at the contacting time between the magnetic loop element 30 and the armature 9-2.

Figure 8:
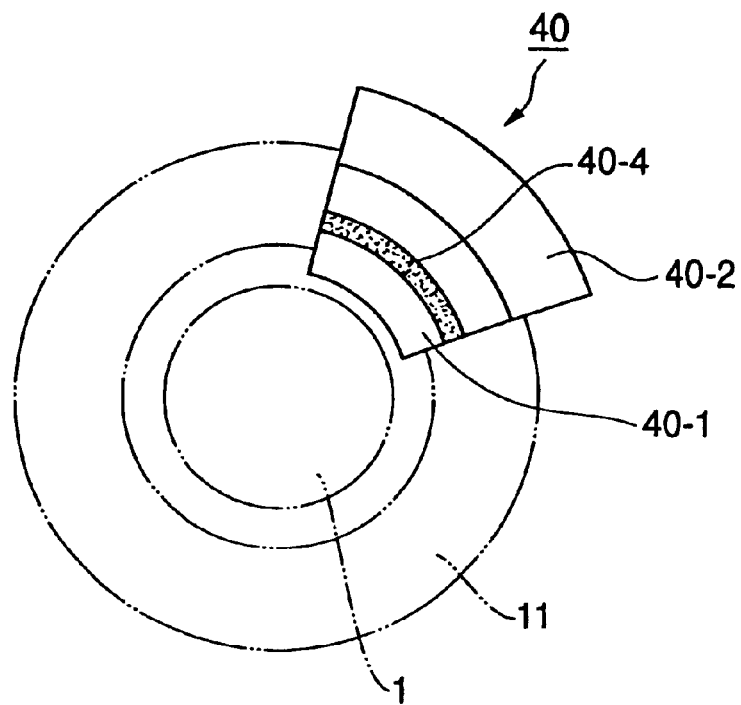
FIG. 8 corresponds to FIG. 7 and shows still another embodiment (of a non-ring shape) of the magnetic loop element (or a magnetic member) of the split structure.
Figure 9:
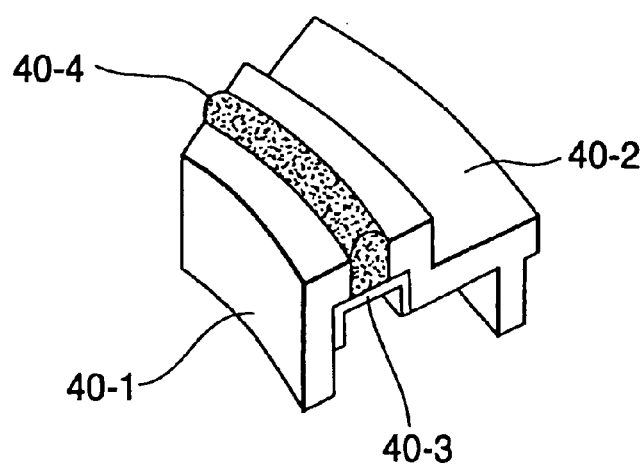
FIG. 9 is a perspective view of the magnetic loop element of the non-ring shape shown in FIG. 8.

On the other hand, the non-ring-shaped magnetic loop element 40, as shown in FIG. 8 and FIG. 9, is arranged at a point, in case the size of the armature 9-2 may be smaller than that of the electromagnet 11. Structurally like the aforementioned structure of FIG. 4 and FIG. 5, the magnetic loop element body is constructed to include two parts (or pieces) of an inner member 40-1 and an outer member 40-2, and an arcuate part (of stainless steel, a copper alloy or the like) 40-3 made of a non-magnetic material is fitted and fixed by brazing, welding, press-fitting or adhering it in an arcuate space, which is formed between the inner member 40-1 and the outer member 40-2. The space among the inner member 40-1, the outer member 40-2 and the non-magnetic material arcuate part 40-3 is sealed off the oil or dust by baking and molding it with fluororubber 40-4, by pressing or adhering a sealant or the like.

The fixing means for this non-ring-shaped magnetic loop element 40 can be exemplified by using a method for casting it into the clutch case 2-1 or means for fixing it by bolt-fastening or caulking it.

Moreover, the aforementioned non-ring-shaped magnetic loop element shown in FIG. 8 and FIG. 9 is exemplified by fixing the inner member 40-1 and the outer member 40-2 with the arcuate member 40-3 made of the non-magnetic material. As shown, however, an integral construction may be made by providing the reinforcing bridges or may naturally be made by providing the reinforcing bridge of the plate-shaped or rod-shaped non-magnetic material 30-3, as shown in FIG. 6 and FIG. 7.

Here, the electromagnet 11 in the aforementioned external control type fan-coupling device of the invention is exemplified by forming it in the ring shape on the rotary shaft member 1 through the bearing 14. By using a method of fixing the electromagnet not through the bearing 14 but with a strong bracket, stay or the like from the outside, however, it is possible to adopt a variety of structures such as a shape of letter "U" or letter "C" (or semicircular shape) arranged around the rotary shaft member or their combination.

What is claimed is:

1. An external control type fan-coupling device comprising a housing having a case made of a non-magnetic material and a cover mounted on said case, said housing being borne through a bearing on a rotary shaft, a partition in said housing and dividing said housing into an oil sump and torque transmission chamber, an oil feed adjusting hole formed through said partition for providing communication between said oil sump and said torque transmission chamber, an oil recovering circulation passage extending from an outer circumferential position in said torque transmission chamber to said oil sump, a dam in the torque transmission chamber near the oil recovering circulation passage, a drive disk secured to an end of the rotary shaft and disposed in the torque transmission chamber, a valve member having a magnetism and disposed for selectively opening and closing the oil feed adjusting hole in the partition, an electromagnet supported on the rotary shaft through a bearing and substantially opposed to the oil sump, said electromagnet operating the valve member for selectively opening, closing and controlling the oil feed adjusting hole for controlling a flow of oil into the torque transmission chamber for controlling torque transmission from the drive disk to the housing, and a magnetic member assembled to the housing between the electromagnet and the valve member for transmitting magnetic flux of the electromagnet to the valve member, wherein said magnetic member is an integral structure having a plurality of arcuate holes in a plate member and sealed by filling said arcuate holes with a sealant.

2. The external control type fan-coupling device according to claim 1, wherein said sealant is a rubbery sealant.

3. The external control type fan-coupling device according to claim 1, wherein said magnetic member includes an inner ring, and outer ring and ring-shaped space therebetween, said sealant filling said ring-shaped space and protruding from at least one of said inner ring and said outer ring.

4. The external control type fan-coupling device according to claim 1, wherein said valve member is made of a leaf spring material of steel and has an armature.

5. The external control type fan-coupling device according to claim 1, wherein the armature of said valve member is arranged between the rotary shaft and the oil feed adjusting hole.

6. An external control type fan-coupling device comprising a housing having a case made of a non-magnetic material and a cover mounted on said case, said housing being borne through a bearing on a rotary shaft, a partition in said housing and dividing said housing into an oil sump and torque transmission chamber, an oil feed adjusting hole formed through said partition for providing communication between said oil sump and said torque transmission chamber, an oil recovering circulation passage extending from an outer circumferential position in said torque transmission chamber to said oil sump, a dam in the torque transmission chamber near the oil recovering circulation passage, a drive disk secured to an end of the rotary shaft and disposed in the torque transmission chamber, a valve member having a magnetism and disposed for selectively opening and closing the oil feed adjusting hole in the partition, an electromagnet supported on the rotary shaft through a bearing and substantially opposed to the oil sump, said electromagnet operating the valve member for selectively opening, closing and controlling the oil feed adjusting hole for controlling a flow of oil into the torque transmission chamber for controlling torque transmission from the drive disk to the housing, and a magnetic member assembled to the housing between the electromagnet and the valve member for transmitting magnetic flux of the electromagnet to the valve member, wherein said magnetic member is a split structure formed into a ring shape disposed so that the rotary shaft is substantially at the center of the ring shape, the ring shaped magnetic member including inner and outer rings disposed to define a ring-shaped space therebetween.

7. The external control type fan-coupling device according to claim 6, wherein the inner ring and the outer ring are jointed by a non-magnetic material ring fitted and fixed between the inner ring and the outer ring.

8. The external control type fan-coupling device according to claim 6, wherein the inner ring and the outer ring are fitted and fixed with a non-magnetic material ring, and wherein said non-magnetic material ring and said outer ring are jointed by brazing them.

9. The external control type fan-coupling device according to claim 6, wherein the inner ring and the outer ring are fitted and fixed with a non-magnetic material ring, and wherein said ring-shaped space is sealed by filling it with a sealant.

10. The external control type fan-coupling device according to claim 9, wherein said sealant is a rubbery sealant.

11. The external control type fan-coupling device according to claim 9, wherein said sealant filling said ring-shaped space protrudes from at least one of said inner ring and said outer ring.

12. The external control type fan-coupling device according to claim 6, wherein said inner ring and said outer ring are jointed with a non-magnetic material disposed at a plurality of portions in said ring-shaped space, and wherein the ring-shaped space at the portions other than the portions jointed with said non-magnetic material is sealed by filling the portions with a sealant.

13. The external control type fan-coupling device according to claim 12, wherein said sealant is a rubbery sealant.

14. The external control type fan-coupling device according to claim 12, wherein said sealant filling said ring-shaped space protrudes from at least one of said inner ring and said outer ring.

15. The external control type fan-coupling device according to claim 13, wherein the rubbery sealant filling said ring-shaped space is baked and molded on said inner ring and said outer ring.

16. The external control type fan-coupling device according to claim 15, wherein the sealing filling said ring-shaped space protrudes from at least one of said inner ring and said outer ring toward the valve member.

* * * * *